United States Patent
Yamada et al.

(10) Patent No.: US 12,289,016 B2
(45) Date of Patent: Apr. 29, 2025

(54) ROTATING ELECTRIC MACHINE AND STATOR MANUFACTURING METHOD

(71) Applicant: Mitsubishi Electric Corporation, Tokyo (JP)

(72) Inventors: Takuro Yamada, Tokyo (JP); Ryoji Miyatake, Tokyo (JP); Haruyuki Kometani, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 97 days.

(21) Appl. No.: 17/922,817

(22) PCT Filed: Sep. 7, 2020

(86) PCT No.: PCT/JP2020/033714
§ 371 (c)(1),
(2) Date: Nov. 2, 2022

(87) PCT Pub. No.: WO2022/049750
PCT Pub. Date: Mar. 10, 2022

(65) Prior Publication Data
US 2023/0198319 A1    Jun. 22, 2023

(51) Int. Cl.
*H02K 1/16*     (2006.01)
*H02K 1/18*     (2006.01)
(Continued)

(52) U.S. Cl.
CPC ............... *H02K 1/16* (2013.01); *H02K 1/185* (2013.01); *H02K 15/03* (2013.01); *H02K 16/02* (2013.01); *H02K 2201/15* (2013.01)

(58) Field of Classification Search
CPC ........... H02K 1/16; H02K 1/185; H02K 1/17; H02K 1/246; H02K 1/148; H02K 15/03; H02K 16/02; H02K 1/278
See application file for complete search history.

(56) References Cited

U.S. PATENT DOCUMENTS

| 4,758,756 A  * | 7/1988 | Pouillange | H02K 19/18 |
|---|---|---|---|
|  |  |  | 310/152 |
| 10,014,738 B2 * | 7/2018 | Tojima | H02K 49/102 |

FOREIGN PATENT DOCUMENTS

| DE | 102010039300 A1 |  | 2/2012 |  |
|---|---|---|---|---|
| DE | 102011121174 A1 | * | 6/2013 | ............ B60L 3/0061 |

(Continued)

OTHER PUBLICATIONS

JP-2016135014-A machine translation Jul. 26, 2024.*
(Continued)

*Primary Examiner* — Leda T Pham
(74) *Attorney, Agent, or Firm* — BUCHANAN, INGERSOLL & ROONEY PC

(57) ABSTRACT

Provided is a rotating electric machine in which stator coils can be easily inserted into slots while the effect of improving the output performance by a magnet yoke portion is enhanced. The rotating electric machine includes: a stator including a stator core having a plurality of slots, stator coils, and stator magnet, the stator coil and the stator magnet being inserted in each of the plurality of slots; a first rotor; and a second rotor. The stator core has a magnet yoke portion between the stator coil and the stator magnet, and is composed of a first stator core, and a second stator core having the magnet yoke portion.

13 Claims, 9 Drawing Sheets

(51) Int. Cl.
*H02K 15/03* (2006.01)
*H02K 16/02* (2006.01)

(56) References Cited

FOREIGN PATENT DOCUMENTS

| EP | 2792052 B1 | | 3/2016 |
|---|---|---|---|
| JP | H07241050 A | * | 9/1995 |
| JP | 2005168128 A | | 6/2005 |
| JP | 2010187476 A | | 8/2010 |
| JP | 2016135014 A | * | 7/2016 |

OTHER PUBLICATIONS

JP-H07241050-A machine translation Jul. 26, 2024.*
DE-102011121174-A1 machine translation Jul. 26, 2024.*
Extended European Search Report dated Mar. 6, 2024, issued in the corresponding European Patent Application No. 20952484.2, 7 pages.
International Search Report (PCT/ISA/210) with translation and Written Opinion (PCT/ISA/237) mailed on Nov. 17, 2020, by the Japan Patent Office as the International Searching Authority for International Application No. PCT/JP2020/033714. (8 pages).
First Office Action dated Oct. 17, 2024, issued in the corresponding Chinese Patent Application No. 202080103694.5, 14 pages including 7 pages of English Translation.
Office Action dated Feb. 21, 2025, issued in the corresponding Chinese Patent Application No. 202080103694.5, 14 pages including 9 pages of English Translation.

* cited by examiner

ROTATING ELECTRIC MACHINE AND STATOR MANUFACTURING METHOD

TECHNICAL FIELD

The present disclosure relates to a rotating electric machine and a stator manufacturing method.

BACKGROUND ART

As an electric generator such as a wind power generation device, a magnetic-geared motor (electric generator) in which a magnetic speed reducer or a magnetic speed increaser, and a motor (electric generator) are integrated is used. The magnetic-geared motor (electric generator) is composed of a low-speed rotor, a high-speed rotor provided coaxially with the low-speed rotor, and a stator including a stator coil and a stator magnet (permanent magnet). In a case where the magnetic-geared motor (electric generator) is used as an electric generator of a wind power generation device, the low-speed rotor rotates in conjunction with a wind mill. The high-speed rotor is rotated at a high speed according to a magnetic gear effect due to rotation of the low-speed rotor, and accordingly, induced power is generated in the stator coil, whereby power generation is performed. Such a rotating electric machine can change each rotation speed of two rotors in a non-contact manner, and thus maintenance for mechanical wear or the like is unnecessary.

The stator of the rotating electric machine includes a stator core having a plurality of slots, and a stator coil and a stator magnet accommodated in each slot. The stator coil and the stator magnet accommodated in each slot are disposed so as to be arranged in a radial direction, and each stator magnet is magnetized so as to have the same polarity in the radial direction. Thus, it is conceivable that a magnet yoke portion made of magnetic material is provided between the stator coil and the stator magnet to improve the output performance of the rotating electric machine.

In a conventional rotating electric machine, the magnet yoke portion is formed by providing a portion having a narrow slot width between the stator coil and the stator magnet in each slot of the stator core (see, for example, Patent Document 1).

CITATION LIST

Patent Document

Patent Document 1: Japanese Laid-Open Patent Publication No. 2016-135014

SUMMARY OF THE INVENTION

Problems to be Solved by the Invention

In the conventional rotating electric machine, the stator coils need to pass through gaps of the magnet yoke portions when being inserted into the slots from a radially inner side. Thus, it is necessary to ensure that the gaps of the magnet yoke portions have a certain size such that the stator coils can be inserted into the slots. However, when the gap of the magnet yoke portion is formed larger, the magnet yoke portion becomes smaller, and thus the effect of improving output performance cannot be sufficiently obtained. On the other hand, when the gap of the magnet yoke portion is formed small, the stator coils are difficult to be inserted into the slots.

The present disclosure has been made to solve the above problem, and an object of the present disclosure is to provide a rotating electric machine in which the stator coils can be easily inserted into the slots while the effect of improving output performance by the magnet yoke portion is enhanced.

Solution to the Problems

A rotating electric machine according to the present disclosure includes: a stator including a stator core having a plurality of slots, stator coils, and stator magnets, the stator coil and the stator magnet being inserted in each of the plurality of slots; a first rotor provided rotatably relative to the stator with a first gap from the stator; and a second rotor provided coaxially with the first rotor with a second gap from the first rotor. The stator core has a magnet yoke portion between the stator coil and the stator magnet, and is composed of a first stator core, and a second stator core having the magnet yoke portion.

Effect of the Invention

In the rotating electric machine according to the present disclosure, the stator core is composed of the first stator core, and the second stator core having the magnet yoke portion. Therefore, the stator coils are easily inserted into the slots while the effect of improving the output performance by the magnet yoke portion is enhanced.

DESCRIPTION OF EMBODIMENTS

Figure 1:
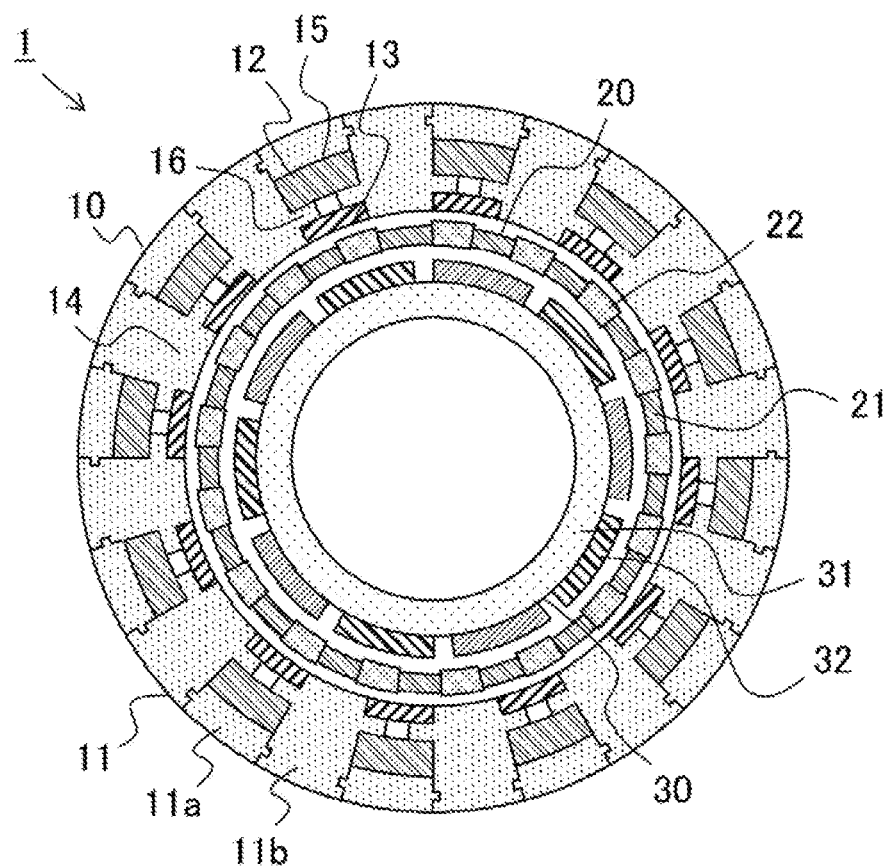
FIG. 1 is a schematic sectional view of a rotating electric machine according to Embodiment 1.

Hereinafter, a rotating electric machine according to embodiments for carrying out the present disclosure will be described in detail with reference to the drawings. In the drawings, the same reference characters denote the same or corresponding parts.

Embodiment 1

FIG. 1 is a schematic sectional view of a rotating electric machine according to Embodiment 1. FIG. 1 is the schematic sectional view along a plane perpendicular to an axial direction of the rotating electric machine. The rotating electric machine of the present embodiment is a magnetic-geared motor (electric generator) used as an electric generator of a wind power generation device, for example. A rotating electric machine 1 of the present embodiment includes: a stator 10; a low-speed rotor 20 provided rotatably relative to the stator 10 with a gap from stator 10; and a high-speed rotor 30 provided coaxially with the low-speed rotor 20 with a gap from the low-speed rotor 20. The stator 10, the low-speed rotor 20, and the high-speed rotor 30 are cylindrical-shaped and disposed coaxially with each other. In the rotating electric machine 1 of the present embodiment, the stator 10, the low-speed rotor 20, and the high-speed rotor 30 are disposed in this order from an outer circumferential side.

The stator 10 includes a cylindrical stator core 11, stator coils 12, and stator magnets 13. The stator core 11 has twelve teeth 14 protruding to an inner circumferential side, and twelve slots 15 are formed between teeth 14. The stator core 11 is, for example, formed by stacking electromagnetic steel sheets. The stator coil 12 is inserted on the outer circumferential side inside each slot 15, and the stator magnet 13 is disposed on the inner circumferential side inside each slot 15. The stator magnet 13 is a permanent magnet, and each stator magnet 13 inserted in the corresponding slot 15 is magnetized so as to have the same polarity in the radial direction. Between the stator coil 12 and the stator magnet 13, magnet yoke portions 16 protruding from the teeth 14 to the slots 15 are formed. The stator core 11 is composed of first stator cores 11a and a second stator core 11b described below.

The cylindrical low-speed rotor 20 includes a plurality of magnetic pole pieces 21 disposed so as to be arranged in a circumferential direction, and a plurality of nonmagnetic metal coupling members 22, each of which is disposed between the magnetic pole pieces 21. Seventeen magnetic pole pieces 21 and seventeen coupling members 22 are disposed.

The high-speed rotor 30 includes a cylindrical high-speed rotor core 31, and ten rotor magnets 32 disposed so as to be arranged in the circumferential direction on a surface on the outer circumferential side of the high-speed rotor core 31. The rotor magnets 32 are permanent magnets magnetized in the radial direction. In the ten rotor magnets 32 disposed so as to be arranged in the circumferential direction, S pole and N pole are arranged alternately in the circumferential direction. The rotating electric machine 1 of the present embodiment is a so-called magnetic-geared motor (electric generator) with ten poles and twelve slots. In addition, the speed increase ratio determined by the number of magnetic pole pieces/the number of pole pairs is 17/5, i.e., 3.4. The high-speed rotor 30 rotates at 3.4 times the rotation speed of the low-speed rotor 20.

Figure 2:
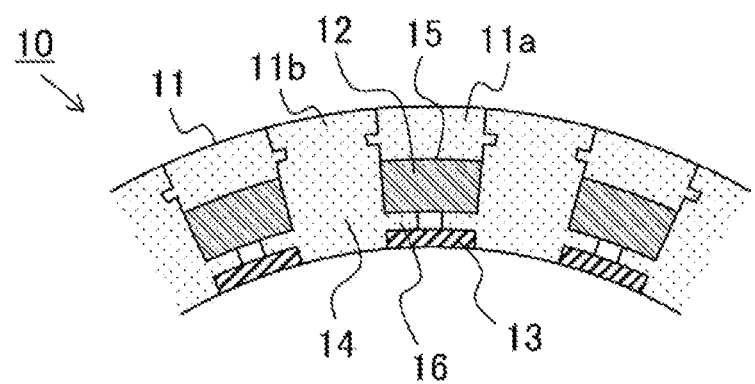
FIG. 2 is a partial sectional view of a stator according to Embodiment 1.

FIG. 2 is a partial sectional view of the stator of the rotating electric machine according to the present embodiment. The stator coil 12 is inserted on the outer circumferential side inside each slot 15, and the stator magnet 13 is disposed on the inner circumferential side inside the slot 15. Between the stator coil 12 and the stator magnet 13, magnet yoke portions 16 protruding from the teeth 14 to the slots 15 are formed. The magnet yoke portions 16 allow more magnetic flux of the stator magnet 13 to pass through, thereby improving the magnetic force of stator magnet 13. With the improved magnetic force, necessary torque can be obtained using less quantity of the magnets. As a result, the magnet yoke portions 16 serve to improve output performance of the rotating electric machine.

In the rotating electric machine 1 of the present embodiment, the number of slots 15 of the stator 10 is twelve, the number of magnetic pole pieces 21 of the low-speed rotor 20 is seventeen, and the number of rotor magnets 32 of the high-speed rotor 30 is ten. However, the numbers are not limited thereto.

Next, a stator manufacturing method according to the present embodiment will be described.

Figure 3:
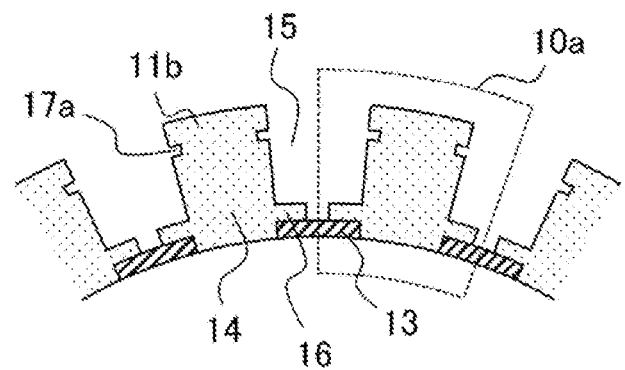
FIG. 3 illustrates a procedure of a stator manufacturing method according to Embodiment 1.

FIG. 3 illustrates a procedure of the stator manufacturing method according to the present embodiment. As shown in FIG. 3, the second stator core 11b in which an outer circumferential part of each slot 15 is removed in the stator core 11 is prepared. In this second stator core 11b, the magnet yoke portions 16 are formed. In addition, the stator magnets 13 are fixed to the second stator core 11b. In the second stator core 11b, grooves 17a each having a quadrangular cross section for being fitted to the first stator cores described below are formed. The second stator core 11b and the stator magnets 13 are integrated so as to be coupled with each other in the circumferential direction. The second stator core 11b may be divided into stator core modules 10a, one of which is indicated with a broken line in FIG. 3. This stator core module 10a is formed by integrating one tooth 14, the magnet yoke portions 16 on both sides, and the half-divided stator magnets 13 on both sides. The second stator core 11b and the stator magnets 13 can be formed by arranging the stator core modules 10a in the circumferential direction and coupling them with each other.

Figure 4:
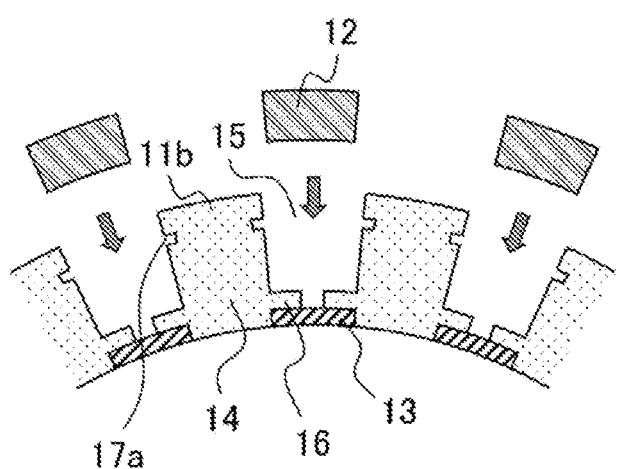
FIG. 4 illustrates a procedure of the stator manufacturing method according to Embodiment 1.

FIG. 4 illustrates the following procedure of the stator manufacturing method according to the present embodiment. As shown in FIG. 4, the stator coils 12 are inserted into the slots 15 from the outer circumferential side of the second stator core 11b in the radial direction. This method enables stator coils 12 shaped in advance to be inserted into the slots 15.

Figure 5:
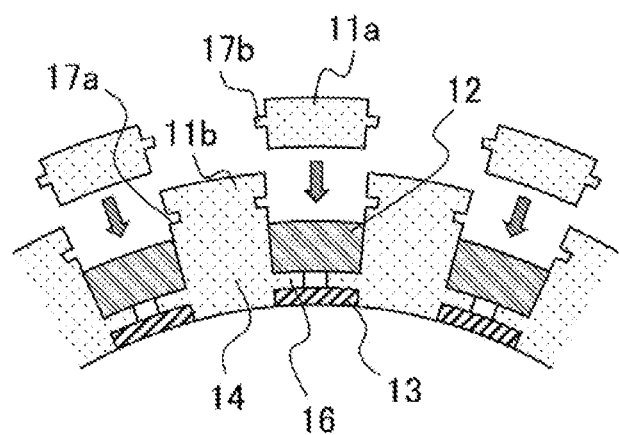
FIG. 5 illustrates a procedure of the stator manufacturing method according to Embodiment 1.

FIG. 5 illustrates the following procedure of the stator manufacturing method according to the present embodiment. As shown in FIG. 5, the first stator cores 11a are inserted on the outer circumferential side of the stator coils 12 inserted in the slots 15 from the axial direction. On the first stator cores 11a, projections 17b each having a quadrangular cross section for being fitted to the grooves 17a of the second stator core 11b are formed.

Figure 6:
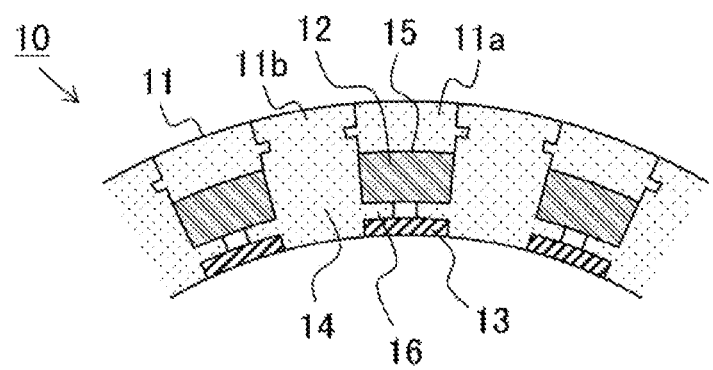
FIG. 6 illustrates a procedure of the stator manufacturing method according to Embodiment 1.

FIG. 6 illustrates the following procedure of the stator manufacturing method according to the present embodiment. As shown in FIG. 6, the stator 10 is completed by fitting the first stator cores 11a inserted from the axial direction, to the second stator core 11b.

As described above, the stator core 11 according to the present embodiment is formed by fitting the first stator cores 11a to the second stator core 11b having the magnet yoke portions 16. The second stator core 11b has a plurality of the slots 15, and the stator magnets 13 are fixed to the second stator core 11b. In addition, the first stator cores 11a are fitted to the second stator core 11b on the outer circumferential side of the stator coils 12 inserted in the plurality of slots 15.

In the stator formed as described above, since the stator coils need not pass through gaps of the magnet yoke portions when being inserted into the slots, the magnet yoke portions can be enlarged. As a result, the stator coils can be easily inserted into the slots while the effect of improving the output performance by the magnet yoke portion is enhanced.

The stator magnets 13 need not be necessarily fixed to the second stator core 11b from the start. After the stator coils 12 are inserted into the second stator core 11b or after the first stator cores 11a are fitted to the second stator core 11b, the stator magnets 13 may be fixed to the second stator core 11b.

Figure 7:
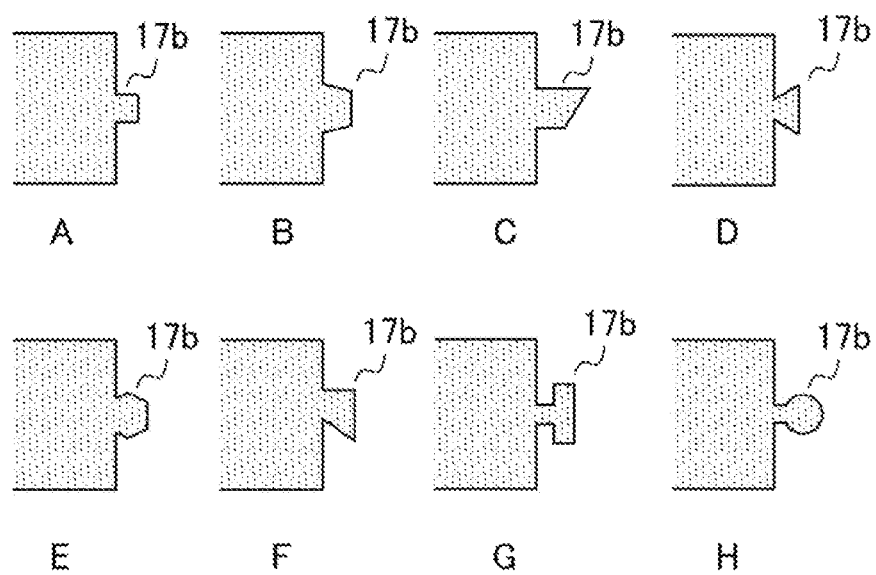
FIG. 7 is a schematic view showing shapes of projections of stator cores according to Embodiment 1.

In the stator according to the present embodiment, the projections 17b are formed on each first stator core 11a and the grooves 17a are formed in the second stator core 11b, to fit the first stator cores 11a to the second stator core 11b. The projections 17b and the grooves 17a may be replaced with each other. FIG. 7 is a schematic view showing shapes of the projections formed on the stator cores according to the present embodiment. As shown in FIG. 7, a cross section of the projection 17b formed on the stator core may have the shape of a quadrangle (A), trapezoid (B, C), triangle (D), hexagon (E), wedge shape (F), T shape (G), circle (H), or the like. The groove 17a has a shape corresponding to the shape of the projection 17b so as to be fitted to the projection 17b.

Figure 8A:
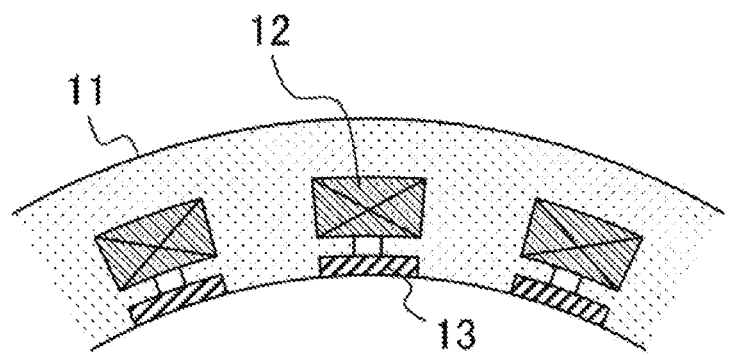
FIG. 8A, FIG. 8B and FIG. 8C illustrate windings of stator coils according to Embodiment 1.
Figure 8B:
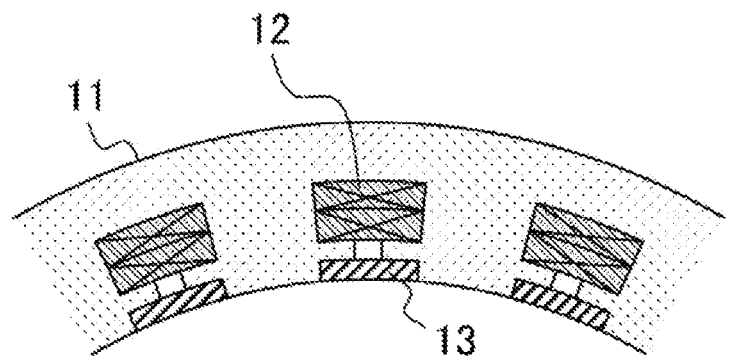
Figure 8C:
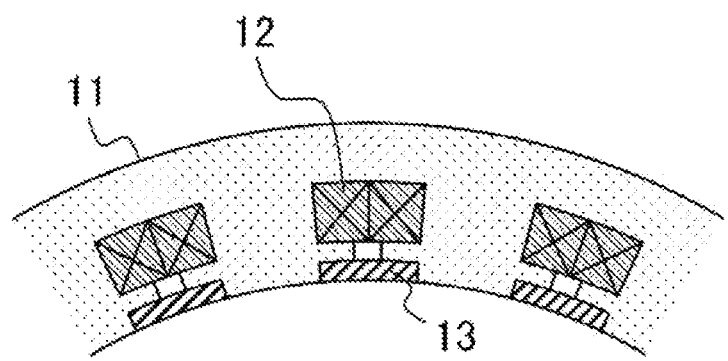

FIG. 8A, FIG. 8B and FIG. 8C illustrate windings of the stator coils according to the present embodiment. FIG. 8A shows a state in which one stator coil distributedly wound is inserted in each slot. FIG. 8B shows a state in which two stator coils distributedly wound are arranged in the radial direction and inserted in each slot. FIG. 8C shows a state in which one stator coil concentratedly wound is inserted in each of two slots adjacent to each other. In the rotating electric machine of the present embodiment, both the stator coil distributedly wound and the stator coil concentratedly wound can be applied. In FIG. 8A, FIG. 8B and FIG. 8C, each stator core 11 is not divided into the first stator core and the second stator core, and is integrally formed.

Embodiment 2

A structure of a rotating electric machine of Embodiment 2 is the same as the structure of the rotating electric machine of Embodiment 1. In the stator of Embodiment 1, the stator coils are inserted into the slots 15 from the outer circumferential side in the radial direction. In a stator of Embodiment 2, the stator coils are inserted into the slots 15 from the inner circumferential side in the radial direction.

A stator manufacturing method according to Embodiment 2 will be described.

Figure 9:
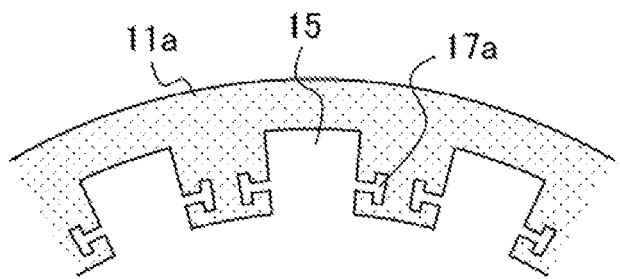
FIG. 9 illustrates a procedure of a stator manufacturing method according to Embodiment 2.

FIG. 9 illustrates a procedure of the stator manufacturing method according to the present embodiment. As shown in FIG. 9, the first stator core 11a in which the inner circumferential part of each slot 15 is removed in the stator core 11 is prepared. In this first stator core 11a, the grooves 17a each having a T-shaped cross section for being fitted to the second stator cores described below are formed.

Figure 10:
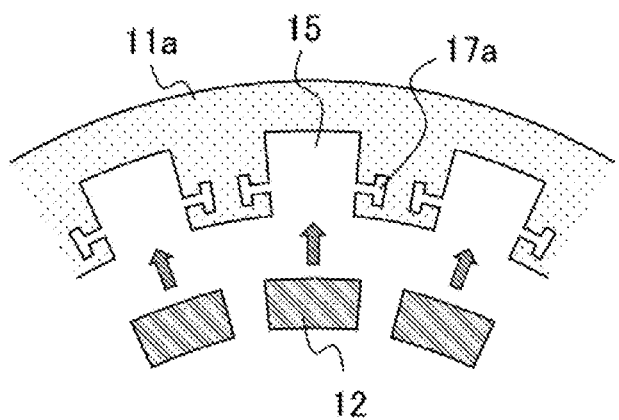
FIG. 10 illustrates a procedure of the stator manufacturing method according to Embodiment 2.

FIG. 10 illustrates the following procedure of the stator manufacturing method according to the present embodiment. As shown in FIG. 10, the stator coils 12 are inserted into the slots 15 from the inner circumferential side of the first stator core 11a in the radial direction.

Figure 11:
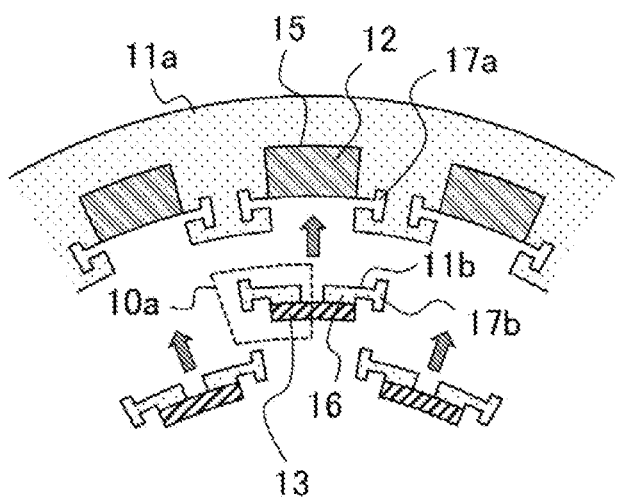
FIG. 11 illustrates a procedure of the stator manufacturing method according to Embodiment 2.

FIG. 11 illustrates the following procedure of the stator manufacturing method according to the present embodiment. As shown in FIG. 11, the second stator cores 11b are inserted on the inner circumferential side of the stator coils 12 inserted in the slots 15 from the axial direction. Each second stator core 11b is integrated by the stator magnet 13. In addition, the magnet yoke portions 16 are formed in each second stator core 11b. In the second stator cores 11b, the projections 17b each having a T-shaped cross section for being fitted to the grooves 17a of the first stator core 11a are formed. Accordingly, the second stator cores 11b are divided into the same number of stator cores as the number of stator coils 12. Also, each second stator core 11b may be divided into the stator core modules 10a, one of which is indicated with a broken line in FIG. 11. This stator core module 10a is formed by integrating the magnet yoke portion 16 on one side and the half-divided stator magnet 13. The second stator core 11b can be formed by arranging two stator core modules 10a side by side and coupling them with each other. Alternatively, each stator core module 10a may be inserted into the first stator core 11a from the axial direction. In addition, the projection 17b is T-shaped, but the shape may be different and be any one shown in FIG. 7.

Figure 12:
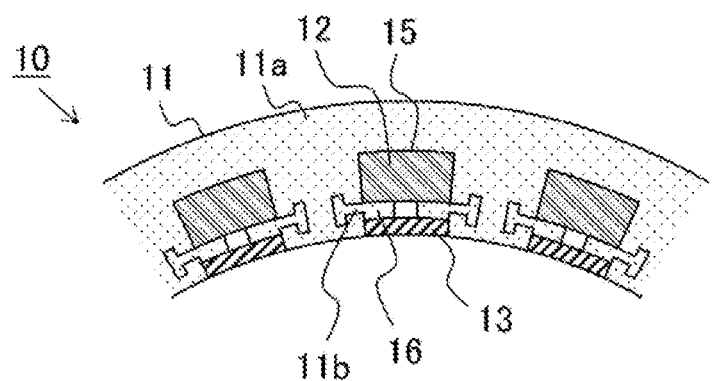
FIG. 12 illustrates a procedure of the stator manufacturing method according to Embodiment 2.

FIG. 12 illustrates the following procedure of the stator manufacturing method according to the present embodiment. As shown in FIG. 12, the stator 10 is completed by fitting the second stator cores 11b inserted from the axial direction to the first stator core 11a.

As described above, the stator core 11 according to the present embodiment is formed by fitting the second stator cores 11b having the magnet yoke portions 16 to the first stator core 11a. The first stator core 11a has the plurality of slots 15, the stator magnets 13 are fixed to the second stator cores 11b, and the second stator cores 11b are fitted to the first stator core 11a on the inner circumferential side of the stator coils 12 inserted in the plurality of slots 15.

In the stator formed as described above, since the stator coils need not pass through the gaps of the magnet yoke portions when being inserted into the slots, the magnet yoke portions can be enlarged. As a result, the stator coils can be easily inserted into the slots while the effect of improving the output performance by the magnet yoke portion is enhanced.

In the stator according to the present embodiment, since the first stator core 11a can be integrally formed, the number of parts is less than that in Embodiment 1.

The stator magnets 13 need not be necessarily fixed to the second stator cores 11b from the start. After the second stator cores 11b are fitted to the first stator core 11a, the stator magnets 13 may be fixed to the second stator cores 11b.

Embodiment 3

The structure of a rotating electric machine of Embodiment 3 is the same as the structure of the rotating electric machine of Embodiment 1. In the stator of Embodiment 1, the stator coils are inserted into the slots 15 from the outer circumferential side in the radial direction. In a stator of Embodiment 3, the stator coils are inserted into the slots 15 from the inner circumferential side in the radial direction as in Embodiment 2.

A stator manufacturing method according to Embodiment 3 will be described.

Figure 13:
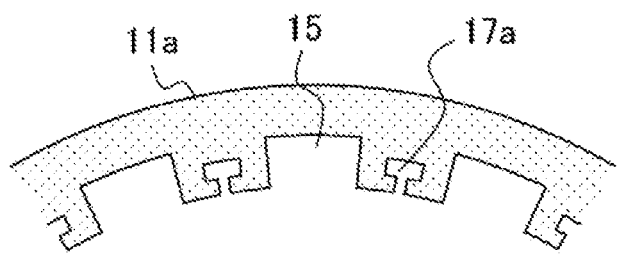
FIG. 13 illustrates a procedure of a stator manufacturing method according to Embodiment 3.

FIG. 13 illustrates a procedure of the stator manufacturing method according to the present embodiment. As shown in FIG. 13, the first stator core 11a in which the inner circumferential part of each slot 15 is removed in the stator core 11 is prepared. In this first stator core 11a, the grooves 17a each having a T-shaped cross section for being fitted to the second stator cores described below are formed.

Figure 14:
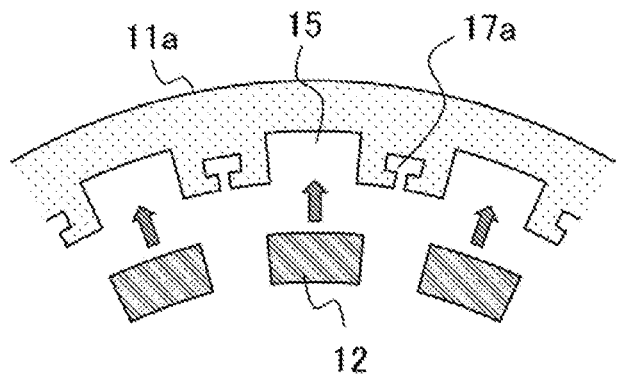
FIG. 14 illustrates a procedure of the stator manufacturing method according to Embodiment 3.

FIG. 14 illustrates the following procedure of the stator manufacturing method according to the present embodiment. As shown in FIG. 14, the stator coils 12 are inserted into the slots 15 from the inner circumferential side of the first stator core 11a in the radial direction.

Figure 15:
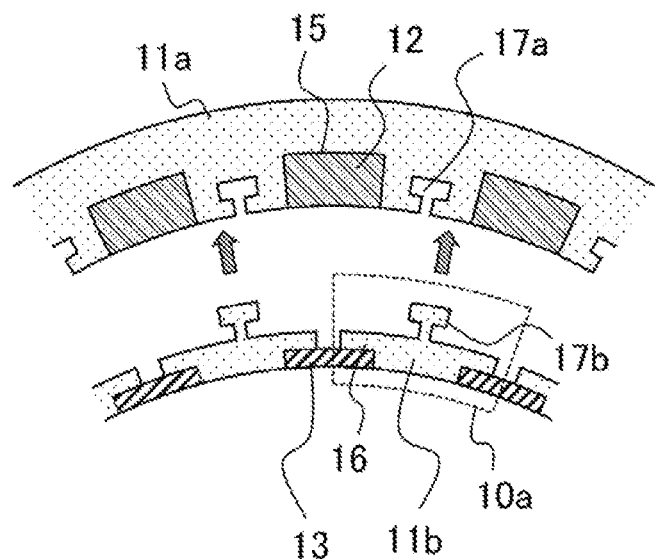
FIG. 15 illustrates a procedure of the stator manufacturing method according to Embodiment 3.

FIG. 15 illustrates the following procedure of the stator manufacturing method according to the present embodiment. As shown in FIG. 15, the second stator cores 11b are inserted on the inner circumferential side of the stator coils 12 inserted in the slots 15 from the axial direction. The second stator cores 11b are integrally formed by coupling the inner circumferential parts of the stator core 11, and the stator magnets 13 with each other in the circumferential direction. In addition, the magnet yoke portions 16 are formed in the second stator cores 11b. On the second stator cores 11b, the projections 17b each having a T-shaped cross section for being fitted to the grooves 17a of the first stator core 11a are formed. The second stator cores 11b may be divided as the stator core modules 10a, one of which is indicated with a broken line in FIG. 15. This stator core module 10a is formed by integrating the magnet yoke portions 16 on both sides, the half-divided stator magnets 13 on both sides, and the inner circumferential part of the stator core 11. The second stator cores 11b and the stator magnets 13 can be formed by arranging the stator core modules 10a in the circumferential direction and coupling them with each other. Alternatively, each stator core module 10a may be inserted into the first stator core 11a from the axial direction. In addition, the projection 17b is T-shaped, but the shape may be different and be any one shown in FIG. 7.

Figure 16:
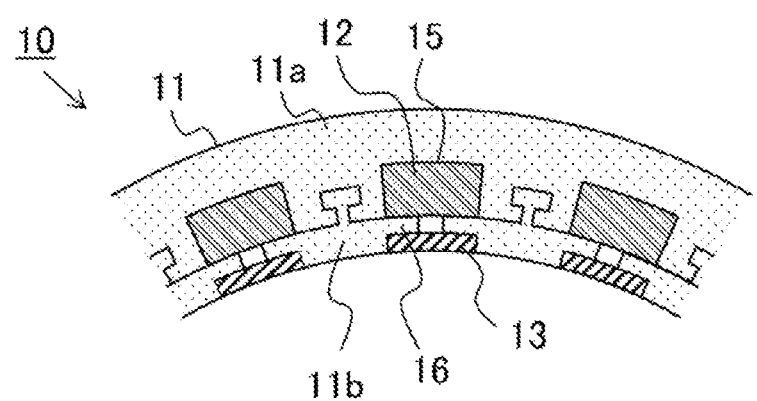
FIG. 16 illustrates a procedure of the stator manufacturing method according to Embodiment 3.

FIG. 16 illustrates the following procedure of the stator manufacturing method according to the present embodiment. As shown in FIG. 16, the stator 10 is completed by fitting the second stator cores 11b inserted from the axial direction to the first stator core 11a.

As described above, the stator core 11 according to the present embodiment is formed by fitting the second stator cores 11b having the magnet yoke portions 16 to the first stator core 11a. The first stator core 11a has the plurality of slots 15, the stator magnets 13 are fixed to the second stator cores 11b, and the second stator cores 11b are fitted to the first stator core 11a on the inner circumferential side of the stator coils 12 inserted in the plurality of slots 15.

In the stator formed as described above, since the stator coils need not pass through the gaps of the magnet yoke portions when being inserted into the slots, the magnet yoke portions can be enlarged. As a result, the stator coils can be easily inserted into the slots while the effect of improving the output performance by the magnet yoke portion is enhanced.

In the stator of Embodiment 2, each second stator core 11b is fitted to the first stator core 11a with two fitting portions per slot. In the stator of Embodiment 3, each second stator core 11b can be fitted to the first stator core 11a with one fitting portion per slot. Thus, the structure of the stator of Embodiment 3 is simplified compared with that of the stator of Embodiment 2.

The stator magnets 13 need not be necessarily fixed to the second stator cores 11b from the start. After the second stator cores 11b are fitted to the first stator core 11a, the stator magnets 13 may be fixed to the second stator cores 11b.

Embodiment 4

The structure of a rotating electric machine of Embodiment 4 is the same as the structure of the rotating electric machine of Embodiment 1. In the stators of Embodiments 1 to 3, the grooves and the projections are used to fit the first stator core and the second stator core with each other. In a stator of Embodiment 4, a stator ring is disposed on an outer circumference of the stator core, and is used to fit the first stator cores to the second stator core.

A stator manufacturing method according to the present embodiment will be described.

Figure 17:
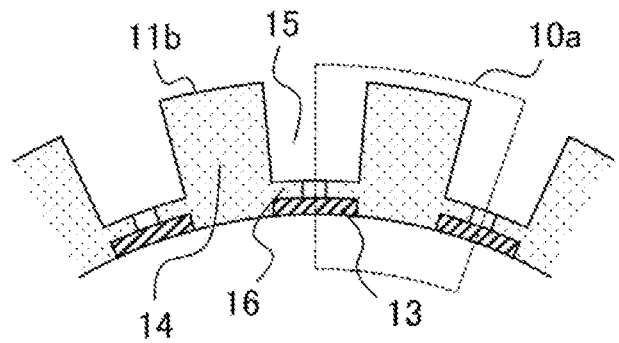
FIG. 17 illustrates a procedure of a stator manufacturing method according to Embodiment 4.

FIG. 17 illustrates a procedure of the stator manufacturing method according to the present embodiment. As shown in FIG. 17, the second stator core 11b in which the outer circumferential part of each slot 15 is removed in the stator core 11 is prepared. This second stator core 11b is integrated so as to be coupled with the stator magnets 13 in the circumferential direction. In addition, the magnet yoke portions 16 are formed in the second stator core 11b. The second stator core 11b may be divided into the stator core modules 10a, one of which is indicated with a broken line in FIG. 17. This stator core module 10a is formed by integrating the tooth 14, the magnet yoke portions 16 on both sides, and the half-divided stator magnets 13 on both sides. The second stator core 11b and the stator magnets 13 can be formed by arranging the stator core modules 10a in the circumferential direction and coupling them with each other.

Figure 18:
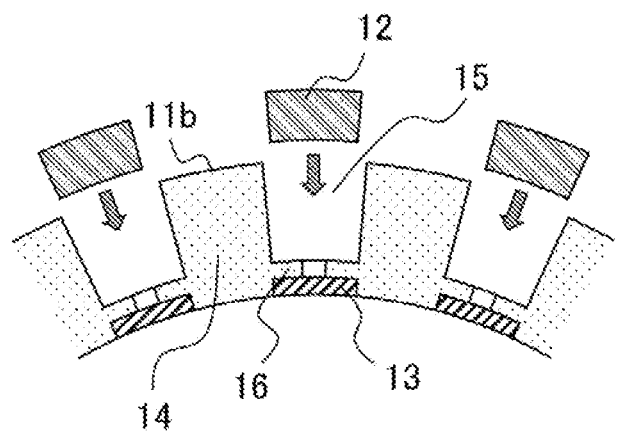
FIG. 18 illustrates a procedure of the stator manufacturing method according to Embodiment 4.

FIG. 18 illustrates the following procedure of the stator manufacturing method according to the present embodiment. As shown in FIG. 18, the stator coils 12 are inserted into the slots 15 from the outer circumferential side of the second stator core 11b in the radial direction.

Figure 19:
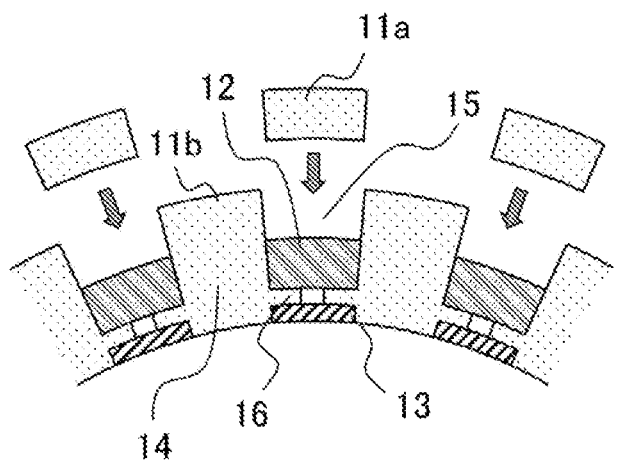
FIG. 19 illustrates a procedure of the stator manufacturing method according to Embodiment 4.

FIG. 19 illustrates the following procedure of the stator manufacturing method according to the present embodiment. As shown in FIG. 19, the first stator cores 11a are inserted on the outer circumferential side of the stator coils 12 inserted in the slots 15 from the outer circumferential side in the radial direction.

Figure 20:
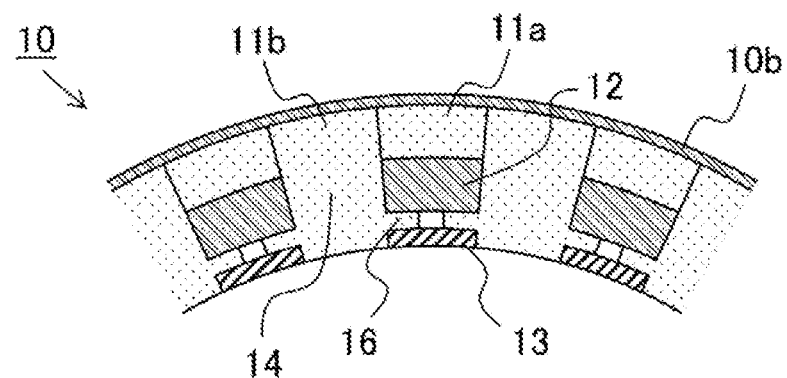
FIG. 20 illustrates a procedure of the stator manufacturing method according to Embodiment 4.

FIG. 20 illustrates the following procedure of the stator manufacturing method according to the present embodiment. As shown in FIG. 20, a stator ring 10b is disposed on the outer circumference of the first stator cores 11a inserted from the outer circumferential side in the radial direction. The stator ring 10b can be disposed by, for example, shrinkage fitting. This stator ring 10b has a function of fastening the first stator cores 11a and the second stator core 11b from the outer circumferential side. The stator 10 is completed by fitting the first stator cores 11a to the second stator core 11b with this stator ring 10b.

As described above, the stator core 11 according to the present embodiment is formed by fitting the first stator cores 11a to the second stator core 11b having the magnet yoke portions 16. The second stator core 11b has the plurality of slots 15, the stator magnets 13 are fixed to the second stator core 11b, and the first stator cores 11a are fitted to the second stator core 11b on the outer circumferential side of the stator coils 12 inserted in the plurality of slots 15.

In the stator formed as described above, since the stator coils need not pass through the gaps of the magnet yoke portions when being inserted into the slots, the magnet yoke portions can be enlarged. As a result, the stator coils can be easily inserted into the slots while the effect of improving the output performance by the magnet yoke portion is enhanced.

In the stator of the present embodiment, neither a groove nor a projection is used to fit the first stator cores to the second stator core. Accordingly, the first stator cores can be inserted from the outer circumferential side in the radial direction, thereby easily manufacturing the stator.

The stator ring of the present embodiment may be applied to the stators of Embodiments 1 to 3 in which the grooves and the projections are provided to the stator cores. The application of the stator ring to each stator of Embodiments 1 to 3 allows the first stator core and the second stator core to be fitted more firmly with each other.

The stator magnets 13 need not be necessarily fixed to the second stator core 11b from the start. After the stator coils 12 are inserted into the second stator core 11b or after the first stator cores 11a are fitted to the second stator core 11b, the stator magnets 13 may be fixed to the second stator core 11b.

Embodiment 5

In the stators of the rotating electric machines of Embodiments 1 to 4, it has been described that the stator core can be formed by arranging the stator core modules in the circumferential direction and coupling them with each other. In the stator formed as described above, a force is applied on the radially inner side of the stator core, and thus an excessive force is applied on the stator magnets, resulting in possibility that the stator magnets are damaged. If the size of the stator is increased, it is difficult to maintain circularity of the stator only by the stator core formed by a stacked body of electromagnetic steel sheets. In a rotating electric machine of Embodiment 5, spacers are inserted into the stator core, and the spacers, and the stator ring disposed at the outer circumference of the stator core are fastened.

Figure 21:
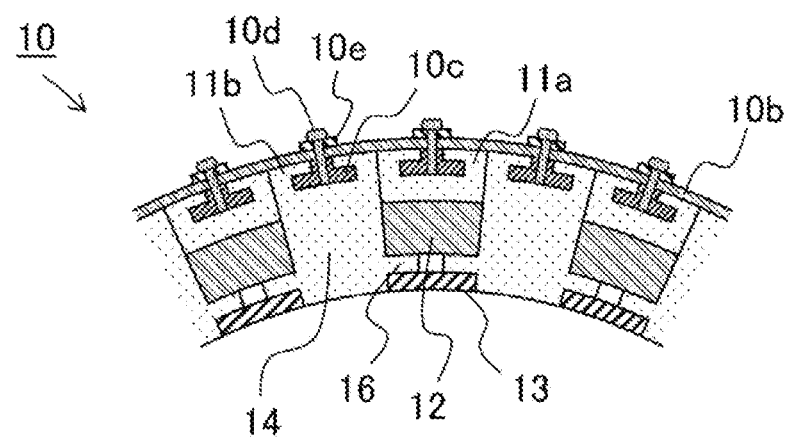
FIG. 21 is a partial sectional view of a stator according to Embodiment 5.
Figure 22:
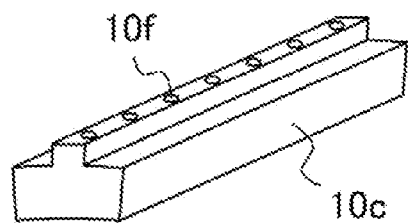
FIG. 22 is a perspective view of a spacer according to Embodiment 5.

FIG. 21 is a partial sectional view of a stator of the rotating electric machine of Embodiment 5. In the rotating electric machine of Embodiment 5, the spacers are inserted into the stator core in the rotating electric machine of Embodiment 4, and the spacers, and the stator ring disposed at the outer circumference of the stator core are fastened. As shown in FIG. 21, spacers 10c are inserted in the first stator cores 11a and the second stator core 11b in the axial direction. The spacers 10c and the stator ring 10b are fastened with fastening bolts 10d. Between the fastening bolts 10d and the stator ring 10b, adjustment liners 10e are inserted. FIG. 22 is a perspective view of the spacer 10c of the present embodiment. The spacer 10c has bolt holes 10f to be fitted to the fastening bolts 10d.

In the stator 10 formed as described above, the first stator cores 11a and second stator core 11b are fixed to the stator ring 10b by tightening the tightening bolts 10d, and therefore an excessive force is not applied on the radially inner side of the stator core. Thus, the first stator cores 11a and the second stator core 11b can be fixed without applying any excessive force on the stator magnets. In addition, such a configuration enables the stator ring 10b to maintain circularity of the stator.

The stator ring may be integrated with a stator frame for fixing the stator to the rotating electric machine body.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotating electric machine
10 stator
10a stator core module
10b stator ring
10c spacer
10d fastening bolt
10e adjustment liner
10f bolt hole
11 stator core
11a first stator core
11b second stator core
12 stator coil
13 stator magnet
14 tooth
15 slot
16 magnet yoke portion
17a groove
17b projection
20 low-speed rotor
21 magnetic pole piece
22 coupling member
30 high-speed rotor
31 high-speed rotor core
32 rotor magnet

The invention claimed is:

1. A rotating electric machine comprising:
a stator including a stator core having a plurality of slots, stator coils, and stator magnets, the stator coil and the stator magnet being inserted in each of the plurality of slots;
a first rotor provided rotatably relative to the stator with a first gap from the stator; and
a second rotor provided coaxially with the first rotor with a second gap from the first rotor, wherein
the stator core includes a first stator core and a second stator core, the second stator core including a magnet yoke portion between the stator coil and the stator magnet.

2. The rotating electric machine according to claim 1, wherein
the second stator core has the plurality of slots, and
the first stator core is fitted to the second stator core on an outer circumferential side of the stator coils inserted in the plurality of slots.

3. The rotating electric machine according to claim 1, wherein
the first stator core has the plurality of slots, and
the second stator core is fitted to the first stator core on an inner circumferential side of the stator coils inserted in the plurality of slots.

4. The rotating electric machine according to claim 3, wherein
the second stator cores, which are divided into the same number of cores as a number of stator coils, are fitted to the first stator core.

5. The rotating electric machine according to claim 1, wherein
the stator further includes a stator ring on an outer circumference of the stator core.

6. The rotating electric machine according to claim 5, wherein
the stator further includes a fastening mechanism to fasten the stator core and the stator ring.

7. A manufacturing method for a stator, wherein
the stator includes a stator core having a plurality of slots, stator coils, and stator magnets, the stator coil and the stator magnet being inserted in each of the plurality of slots, and
the stator core includes a first stator core and a second stator core, the second stator core including a magnet yoke portion between the stator coil and the stator magnet,
the method comprising the steps of:
inserting the stator coils into the plurality of slots from an inner circumferential side or an outer circumferential side in a radial direction; and
fitting the first stator core and the second stator core to each other, on the side where the stator coils are inserted in the plurality of slots.

8. The rotating electric machine according to claim 2, wherein
the stator further includes a stator ring on an outer circumference of the stator core.

9. The rotating electric machine according to claim 3, wherein
the stator further includes a stator ring on an outer circumference of the stator core.

10. The rotating electric machine according to claim 4, wherein
the stator further includes a stator ring on an outer circumference of the stator core.

11. The rotating electric machine according to claim 8, wherein
the stator further includes a fastening mechanism to fasten the stator core and the stator ring.

12. The rotating electric machine according to claim 9, wherein
the stator further includes a fastening mechanism to fasten the stator core and the stator ring.

13. The rotating electric machine according to claim 10, wherein
the stator further includes a fastening mechanism to fasten the stator core and the stator ring.

* * * * *